Figure 1:
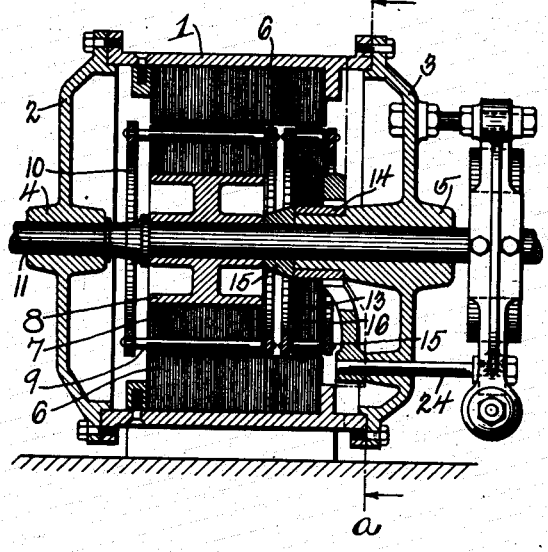

A. E. HANDY.
ELECTRIC MOTOR BRAKE.
APPLICATION FILED JULY 23, 1912.

1,134,739.

Patented Apr. 6, 1915.

Witnesses:

Arthur E. Handy
Inventor
By his Attorney

UNITED STATES PATENT OFFICE.

ARTHUR E. HANDY, OF BROOKLYN, NEW YORK, ASSIGNOR TO OTIS ELEVATOR COMPANY, OF JERSEY CITY, NEW JERSEY, A CORPORATION OF NEW JERSEY.

ELECTRIC-MOTOR BRAKE.

1,134,739.     Specification of Letters Patent.     Patented Apr. 6, 1915.

Application filed July 23, 1912. Serial No. 711,032.

*To all whom it may concern:*

Be it known that I, ARTHUR E. HANDY, a citizen of the United States, residing at Brooklyn, in the county of Kings and State of New York, have invented a new and useful Improvement in Electric-Motor Brakes, of which the following is a specification.

My invention relates to electric motor brakes, and has for an object the provision of a simple, self-contained, practical and efficient brake for electric motors.

A further object is the provision of a motor brake which is operated by the magnetic flux of the motor.

Other objects of my invention will appear from the following description which, taken in connection with the accompanying drawing, sets forth one form in which it may be embodied.

The drawing shows, in a diagrammatic way, my invention as applied to a reversing alternating current electric motor, and it will be apparent that the invention is also applicable to any electric motor.

Figure 2:
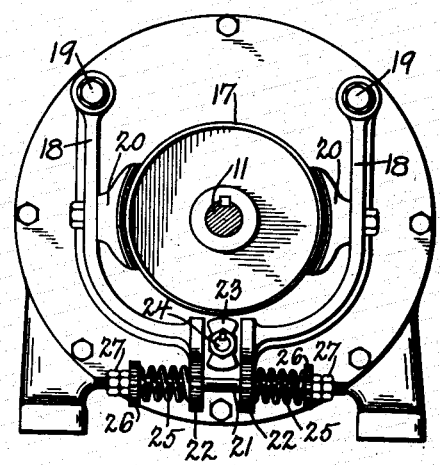
Figure 3:
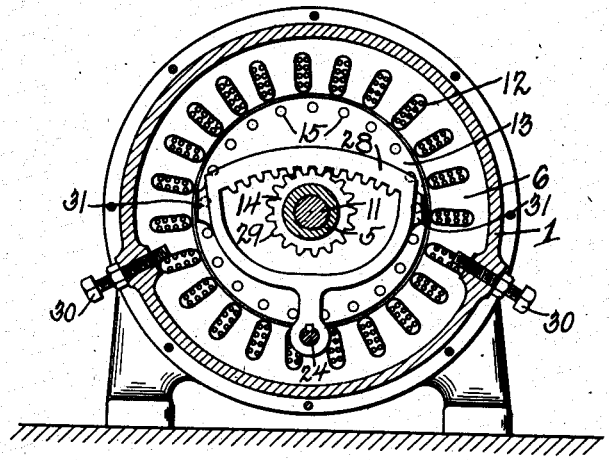

Referring to the drawing, Figure 1 is a sectional elevational side view of an alternating current motor containing an embodiment of my invention; Fig. 2 is an end view of Fig. 1; Fig. 3 is an end sectional view of Fig. 1, the section being taken on the broken line *a—a*, looking in the direction of the arrows.

The motor comprises a casing 1 to each side of which is bolted a cover 2 and 3 carrying bearings 4 and 5, respectively. These bearings support a shaft 11 to which is secured a spider 8 carrying the laminæ 7 which form the rotor of the motor. While the rotor may be wound in any desired manner, I have, for the sake of simplicity, illustrated the same as the familiar squirrel cage type, comprising a series of copper rods 9 buried in corresponding holes in the rotor adjacent the periphery thereof, the rods being electrically short circuited by means of copper rings 10 as is the usual practice in this type of motor. The motor stator comprises a laminated ring 6 rigidly secured in the motor casing and provided with slots 12 (see Fig. 3), which are adapted to receive the usual stator windings. The laminated stator ring 6 is of greater axial length than that of the rotor so as to embrace or encircle a metal ring 13 secured upon a sleeve 14 which is adapted to rotate upon that part of the bearing 5 which extends into the motor casing. A washer 15 is located on the motor shaft between the rotor and the metal ring 13 and its function is to maintain the latter against bodily movement. The metal ring 13 may be solid, or it may be, and preferably is, of built-up or laminated construction as shown, similar to that of the rotor, and like that member, it is preferably provided with a suitable winding such as a squirrel cage winding comprising the bars 15 and the short-circuit rings 16. The ring 13 is operatively connected to any suitable motor brake such as is shown herewith. This brake comprises a brake pulley 17 keyed or otherwise secured to the shaft 11 and rotating therewith, and a pair of brake shoes 20—20 arranged on opposite sides of the periphery of the brake pulley and carried upon a pair of brake levers 18—18. The upper end of each brake lever is pivoted upon a stud 19 which is carried by the motor cover 3, and the lower ends of the brake levers approach each other and extend downwardly so as to form the parallel members 22—22, between which is located a brake operating cam 23. Brake springs 25—25 are carried upon a rod 21 which passes through both of the brake members 22, 22, and is provided with a collar or washer 26 and tension adjusting nuts 27 upon each end. The springs acting against the members 22, 22 tend to carry the brake shoes into frictional engagement with the periphery of the brake pulley and prevent the latter from rotating, and in order to effect the release of the brake shoes I provide an operative connection between the metal ring 13 and the cam 23. This connection comprises a shaft 24, to one end of which is keyed or otherwise securely fastened the cam 23. The shaft is rotatably supported by the cover 3 of the motor and carries upon its other end an internal gear sector 28 which is adapted to mesh with a spur gear 29 formed integral with the sleeve 14 as shown, or made separate if desired, but connected thereto. In order to limit the movement of the sector 28 and consequently that of the ring 13 and brake cam 23, I provide a pair of oppositely disposed adjusting screws 30, 30, which may be threaded into the motor casing 1 and engaged by bosses 31, 31, upon the sector as the latter is moved from a central position to either side when the motor reverses.

Since the metal ring 13 is embraced by the stator 6, it follows that this ring will be subjected to a turning moment similar to that of the rotor, due to the magnetic flux set up by the energization of the stator windings when the motor circuit is closed. The turning moment imparted to the ring 12, acting through the gear 29 and sector 28, tends to rotate the shaft 24 and cam 23, and the latter will tend to move apart the brake members 22, 22, and thereby release the brake shoes from frictional engagement with the brake pulley, and the motor shaft will be free to rotate. It will be observed that the adjusting screws, 30, 30, limit the movement of the sector 28, and hence the ring 13 and cam 23 will likewise have a limited rotary movement. This arrangement prevents the cam from becoming locked between the brake members 22, 22, and determines the extent of movement of the brake shoes toward releasing position. As soon as the motor circuit is opened, the stator flux dies out, and the ring 13 will be rotated backwards into its initial inactive position by means of the brake springs 25, 25, acting through the cams 23, shaft 24, sector 28, and spur gear 29 and the brake will again be applied. If the motor is reversed the ring 13 will also tend to reverse its direction of rotative movement and the cam 23 likewise. Thus it is seen that the brake will be released every time the motor is started irrespective of its direction of rotation.

Heretofore it has been the usual practice to employ a separate magnetic device for releasing a motor brake which device requires considerable current for its operation, particularly where an alternating current is employed. The same is expensive to use and construct, adds an unnecessary complication and often fails to operate properly, due to the effects of residual magnetism and other causes. Then again its action is not dependent upon the motor for its operation, but upon some electro-responsive device such as a circuit closing switch, which, while arranged simultaneously to operate concurrently with that of the motor, may or may not do so. My invention provides a motor brake apparatus which is operated by and concurrently with the motor under all conditions. That is to say, the brake is released by the same means which causes the motor to operate, and is applied to stop or retard the motor every time the circuit of the latter is interrupted or its magnetic strength becomes excessively weakened. For this reason my invention is particularly adapted to electric elevators although it may have a general application.

The ring 13, as before pointed out, may be made in a variety of ways provided it will tend to rotate when the motor is energized. Its torque may be very moderate corresponding to a small current consumption, since a small torque set up in the ring 13 will effect a much greater torque at the cam 23, due to the multiplication of power between the gear 29 and sector 28.

While I have shown and described a simple and effective mechanical connection between the ring 13 and brake cam 23, comprising the gear 29 and the internal gear sector 28, it is obvious that various other mechanical devices could just as well be used to effect the desired results. In fact various changes and modifications could be made in the apparatus by one skilled in the art without departing from the spirit and scope of my invention.

What I claim and desire to secure by Letters Patent of the United States is:—

1. An electric motor comprising an armature and field magnet, a brake for the motor armature, a rotary member concentric with the armature in the path of the magnetic flux of the said field magnet, and an operative connection between said member and the brake.

2. An electric motor comprising an armature and field magnet, a brake for the motor armature, a rotary member concentric with the armature in the path of the magnetic flux of the said field magnet, an operative connection between said member and brake, and means for limiting the movement of said member.

3. An electric motor comprising an armature and field magnet, a brake for the motor armature, a rotary member in the path of the magnetic flux of the said field magnet, an operative connection between said member and brake, and adjustable means for permitting a predetermined movement of said member.

4. An electric motor comprising a stator and a plurality of rotors, a brake for one of the rotors, and means controlled by another of the rotors for operating said brake.

5. An electric motor comprising a field magnet and armature, an armature shaft, a brake for the armature, a member adapted to rotate with respect to said shaft, and an operative connection between said member and brake.

6. An electric motor comprising a field magnet and armature, an armature shaft, a shaft bearing, a brake for the armature, a member rotatively mounted on said bearing and connected to operate the brake, and means operative upon the excitation of said field magnet for rotating said member.

7. An electric motor comprising an armature and field magnet, a brake for the motor armature, an inductive element comprising a wound rotor adapted to have a limited rotation in the magnetic flux of the field magnet of the motor, and an operative connection between said element and brake.

8. An alternating current electric motor comprising a stator and rotor, a rotor shaft, a brake for the shaft, a rotary member embraced by the stator and connected to operate said brake, and inductive means comprising conductors on the said rotary member for imparting a torque to said rotary member to effect the operation of the brake.

9. An alternating current motor comprising a stator, a motor shaft, a rotor secured to the shaft, an additional rotor embraced by the stator and having a movement relative to the said shaft, a brake for the motor shaft, operatively connected to said additional rotor, and means for inducing a torque in said additional rotor upon the excitation of said motor stator to effect the operation of the brake, said means comprising conductors on the additional rotor.

10. An alternating current motor comprising a stator, a motor shaft, a rotor secured to the shaft, an additional rotor embraced by the stator and having a movement relative to the said shaft, a brake for the motor shaft, a reduction gear connection between said additional rotor and brake, and means for imparting a torque in said additional rotor to effect the operation of the brake, said means comprising conductors on the additional rotor.

11. In an electric motor, the combination of a shaft, a rotor secured to said shaft, an additional rotor arranged to rotate with respect to said shaft, a field magnet for said motor embracing both of said rotors, a brake for the motor, and an operative connection between said brake and one of said rotors.

12. In an electric motor the combination of a shaft, a rotor secured to said shaft, an additional rotor adapted to rotate independently of said shaft, a stator embracing both of said rotors, a brake pulley on the motor shaft, spring pressed brake shoes normally engaging said brake pulley, and means associated with one of said rotors for effecting the release of said brake shoes upon magnetizing the said stator.

In testimony whereof I have signed my name to this specification in the presence of two subscribing witnesses.

ARTHUR E. HANDY.

Witnesses:
J. F. RULE,
W. A. DALY.